United States Patent
Samuelson

(10) Patent No.: US 11,739,632 B2
(45) Date of Patent: Aug. 29, 2023

(54) TUBULAR TRANSDUCER FOR MONITORING LOADS ON A COMPLETION

(71) Applicant: Marc Samuelson, Houston, TX (US)

(72) Inventor: Marc Samuelson, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 97 days.

(21) Appl. No.: 17/378,360

(22) Filed: Jul. 16, 2021

(65) Prior Publication Data

US 2022/0018247 A1    Jan. 20, 2022

Related U.S. Application Data

(60) Provisional application No. 63/053,229, filed on Jul. 17, 2020.

(51) Int. Cl.
| | |
|---|---|
| *E21B 47/007* | (2012.01) |
| *G01L 1/24* | (2006.01) |
| *E21B 17/02* | (2006.01) |
| *E21B 47/135* | (2012.01) |
| *G01L 1/22* | (2006.01) |

(52) U.S. Cl.
CPC .......... *E21B 47/135* (2020.05); *E21B 17/028* (2013.01); *G01L 1/22* (2013.01); *G01L 1/246* (2013.01)

(58) Field of Classification Search
None
See application file for complete search history.

(56) References Cited

U.S. PATENT DOCUMENTS

| | | | |
|---|---|---|---|
| 9,103,736 B2 | 8/2015 | Chen et al. | |
| 2011/0061862 A1* | 3/2011 | Loretz ............. | E21B 33/1208 166/250.11 |

(Continued)

FOREIGN PATENT DOCUMENTS

| | | | | |
|---|---|---|---|---|
| BR | 122020012989 B1 * | 1/2022 | ........... | E21B 17/06 |
| GB | 2577812 A * | 4/2020 | ........... | E21B 17/02 |
| WO | 2016133748 A1 | 8/2016 | | |

OTHER PUBLICATIONS

BR-122020012989-B1 English Language Translation (Year: 2013).*

(Continued)

*Primary Examiner* — Curtis A Kuntz
*Assistant Examiner* — Jerold B Murphy
(74) *Attorney, Agent, or Firm* — CANTOR COLBURN LLP

(57) ABSTRACT

A method and apparatus for establishing a secure communication link between a first member and a second member in a wellbore. The apparatus includes a strain sensor and at least one processor. The strain sensor is at a mating end of the second member and measures a strain at the mating end. The at least one processor determines, from the strain, when a first force applied between the first member and the second member exceeds a first force threshold that indicates that the first member and the second member are in a first mating position in which a testable communication link is established between the first member and the second member. The at least one processor tests the testable communication link between the first member and the second member at the first mating position.

15 Claims, 5 Drawing Sheets

(56) References Cited

U.S. PATENT DOCUMENTS

| | | |
|---|---|---|
| 2013/0319768 A1 | 12/2013 | Madhavan et al. |
| 2013/0327138 A1* | 12/2013 | Richard .................. E21B 47/12 |
| | | 73/152.54 |
| 2016/0160639 A1* | 6/2016 | Dudley ................... H04L 67/12 |
| | | 340/853.2 |
| 2016/0273333 A1 | 9/2016 | Pool et al. |
| 2019/0169980 A1 | 6/2019 | Gilleland et al. |
| 2020/0011140 A1 | 1/2020 | Olsen |
| 2020/0182043 A1* | 6/2020 | Downey ................. E21B 34/06 |

OTHER PUBLICATIONS

International Search Report Issued in International Application No. PCT/US2021/041808 dated Nov. 3, 2021; 5 Pages.
Written Opinion Issued in International Application No. PCT/US2021/041808 dated Nov. 3, 2021; 4 Pages.

* cited by examiner

TUBULAR TRANSDUCER FOR MONITORING LOADS ON A COMPLETION

CROSS-REFERENCE TO RELATED APPLICATIONS

This application claims priority to U.S. Provisional Application No 63/053,229, filed Jul. 17, 2020, which is incorporated by reference herein in its entirety.

BACKGROUND

In various completion systems in the resource recovery industry, a first production tubular is lowered into a wellbore on its own and later a second production tubular is lowered downhole to form a connection that provides communication between the first production tubular and a surface location. Forming the connection involves monitoring a force applied between production tubulars using measurements obtained by devices at the surface. However, such surface measurements do not always adequately represent the forces being applied between production tubulars, especially in deviated wellbores. There is therefore a need to obtain more accurate measurements between these production tubulars during the connection process to better control the connection process.

SUMMARY

In one aspect, a method for establishing a secure communication link between a first member and a second member in a wellbore is disclosed. A strain is measured at a mating end of the second member being mated to the first member to determine when a first force between the first member and the second member is greater than a first force threshold that indicates a first mating position in which a testable communication link is established between the first member and the second member. A test is performed on the testable communication link with the first member and the second member at the first mating position.

In another aspect, an apparatus for forming a secure communication link between a first member and a second member in a wellbore is disclosed. The apparatus includes a strain sensor at a mating end of the second member. The strain sensor measures a strain at the mating end. At least one processor determines, from the strain, when a first force applied between the first member and the second member exceeds a first force threshold that indicates that the first member and the second member are in a first mating position in which a testable communication link is established between the first member and the second member. The at least one processor tests the testable communication link between the first member and the second member at the first mating position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
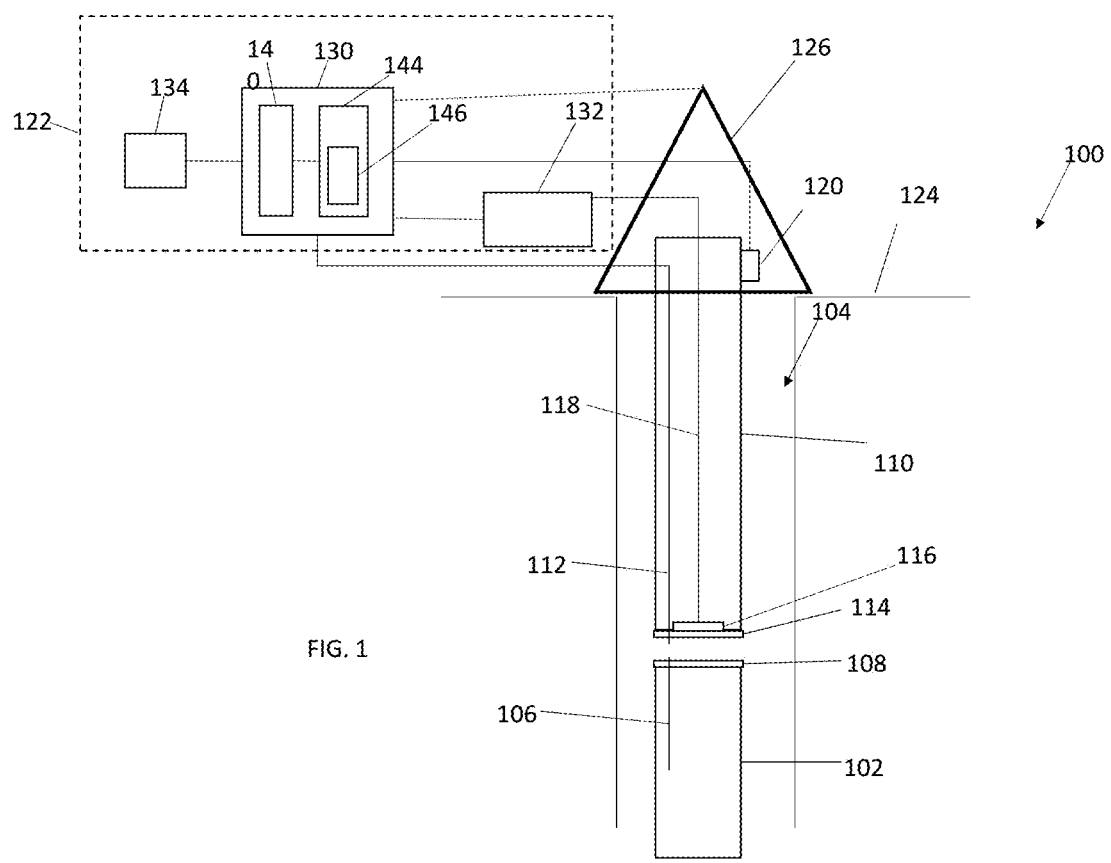
FIG. 1 shows a downhole system in an illustrative embodiment.

FIG. 1 shows a downhole system 100 in an illustrative embodiment. The downhole system 100 includes a first member 102 disposed in a wellbore 104. In various embodiments, the first member 102 is a first tubular such as a lower section of a production string. The first member 102 includes a first communication link 106, such as a fiber optic link, electrical wiring, etc., connected to various devices, sensors, etc. (not shown) of the first member 102. The first member 102 includes a first mating end 108 having various connectors for connection the first communication link 106 of the first member 102 with another communication link. In various embodiments, the connectors are wet connects.

The downhole system 100 further includes second member 110 that is lowered into the wellbore 104 in order to mate with the first member 102. In various embodiments, the second member 110 is a second tubular such as an upper section of a production string. The second member 110 includes a second communication link 112. The second member 110 includes a second mating end 114 having various connectors for connecting the second communication link 112 of the second member 110 to the first communication link 106 of the first member 102. The second communication link 112 can connect to surface equipment 122 at a surface location 124, either directly or via an intermediate communication link. Therefore, mating the second communication link 112 to the first communication link 106 provides an overall communication link between the first member 102 and the surface equipment 122.

The second member 110 further includes one or more strain sensors 116 located at the second mating end 114 of the second member 110. In various embodiments, the one or more strain sensors 116 include an optical strain sensor such as a Fiber Bragg Grating (FBG) and an optical fiber 118 communicatively coupling the FBG to the surface equipment 122. In other embodiments, the one or more strain sensors 116 can be one or more strain gauges or other suitable sensors which are connected to the surface equipment via a suitable communication link.

Figure 2:
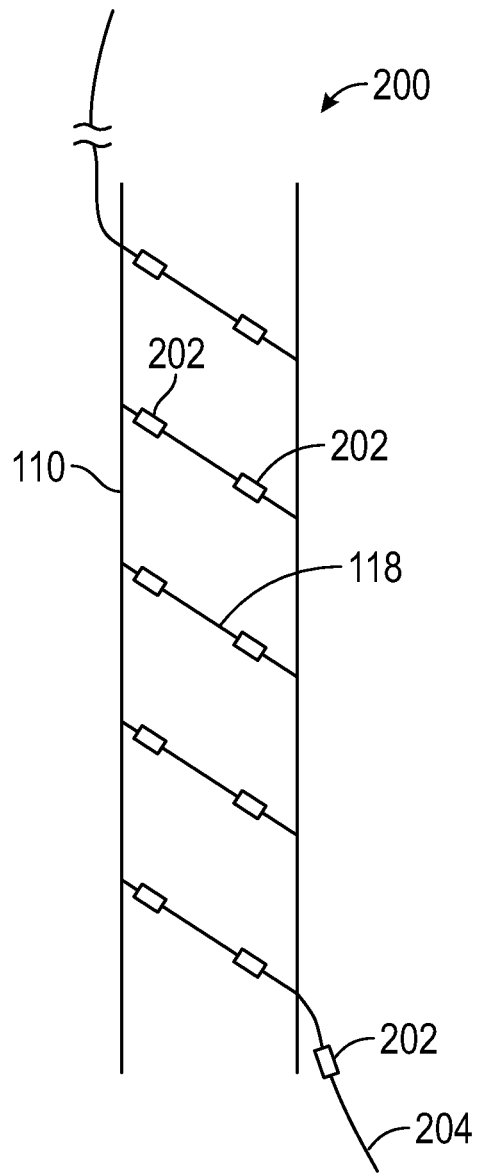
FIG. 2 shows a section of a second member of the downhole system having an optical fiber wrapped around it for determining strain.

FIG. 2 shows a section of the second member 110 having an optical fiber wrapped around it for determining strain. In the embodiment of FIG. 2, the optical fiber 118 is wrapped helically around the outer surface of the second member 110. Although a single optical fiber is shown in FIG. 2, multiple optical fibers can be wrapped around the second member 110 in various embodiments. The optical fiber 118 includes a plurality of FBGs 202 formed therein. The FBGs 202 are spatially distributed along the optical fiber 118 at a selected separation distance, such as a few centimeters, for example.

A free end 204 of the optical fiber 118 having FBGs 202 therein can be placed near or at the second mating end 114 of the second member 110 in order to record a strain or force between the first member 102 and the second member 110 when these two members are being mated to each other.

An FBG 202 is a section of the optical fiber 118 in which the refractive index has been altered into a plurality of regions of higher and lower refractive index which alternate periodically. The periodic distance between the regions of higher refractive index is generally on the order of wavelengths of light and is known as the grating period, D. An FBG 202 typically operates by reflecting light propagating through the optical fiber, wherein the wavelength of the reflected light is related to the grating period by Eq. (1):

$$\lambda_B = 2nD \qquad \text{Eq. (1)}$$

where $\lambda_B$ (known as the Bragg wavelength) is the wavelength of the reflected light, n is the refractive index of the optical fiber, and D is the grating period. From Eq. (1), it is evident that the Bragg wavelength increases when D increases and decreases when D decreases. Any force that causes a strain on the FBG 202 also changes the grating period. This force can therefore be measured or recorded by measuring the Bragg wavelength.

Figure 3:
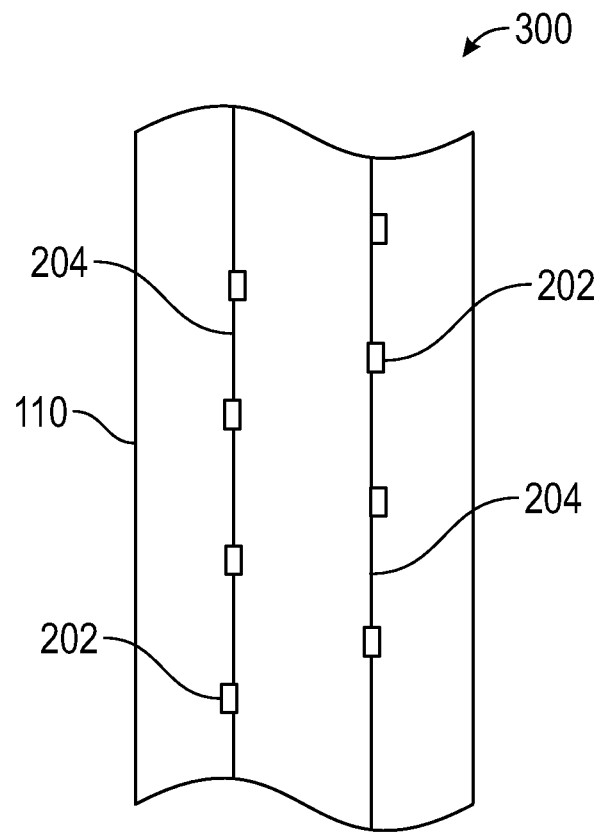
FIG. 3 shows an alternate configuration for an optical fiber with respect to the second member.

FIG. 3 shows an alternate configuration for an optical fiber 118 with respect to the second member 110. In the alternate configuration, the optical fiber 118 is aligned along a longitudinal axis of the second member 110. This configuration can allow for more direct determination of axial forces on the second member 110 than the helical configuration of FIG. 2.

Returning to FIG. 1, a derrick 126 controls axial movement of the second member 110 within the wellbore 104 by raising and/or lowering the second member 110. A hook load indicator 120 measures a weight of the second member 110 as it is raised and/or lowered into the wellbore 104. The measured weight and a model of the trajectory of the second member 10 can be used to infer a force at, for example, the second mating end 114 of the second member 110.

The surface equipment 122 includes a control unit 130, optical interrogator 132 and display 134. The control unit 130 includes a processor 140 and a memory storage device 142, such as a solid-state memory storage device. The memory storage device 142 includes programs 144 or instructions therein which, when accessed by the processor 140, cause the processor 140 to perform the various methods disclosed herein. Data from the control unit 130 can be shown at display 134, allowing an operator to take an action based on the data.

The control unit 130 controls operation of the optical interrogator 132. The optical interrogator 132 transmits a monochromatic light signal such as from a laser and measures a wavelength shift for an FBG 202. The optical interrogator 132 transmits the measured wavelength shifts to the control unit 130, which determines the Bragg wavelength based on the wavelength shift and the wavelength of the light signal originally transmitted through the optical fiber. Alternatively, the optical interrogator 132 can perform calculations to determine the Bragg wavelength. The control unit 130 then determines a strain or force at a mating end of the second member 110 and controls the derrick 126 to control a force between the first member 102 and the second member 110 by raising and/or lowering the second member 110.

Figure 4:
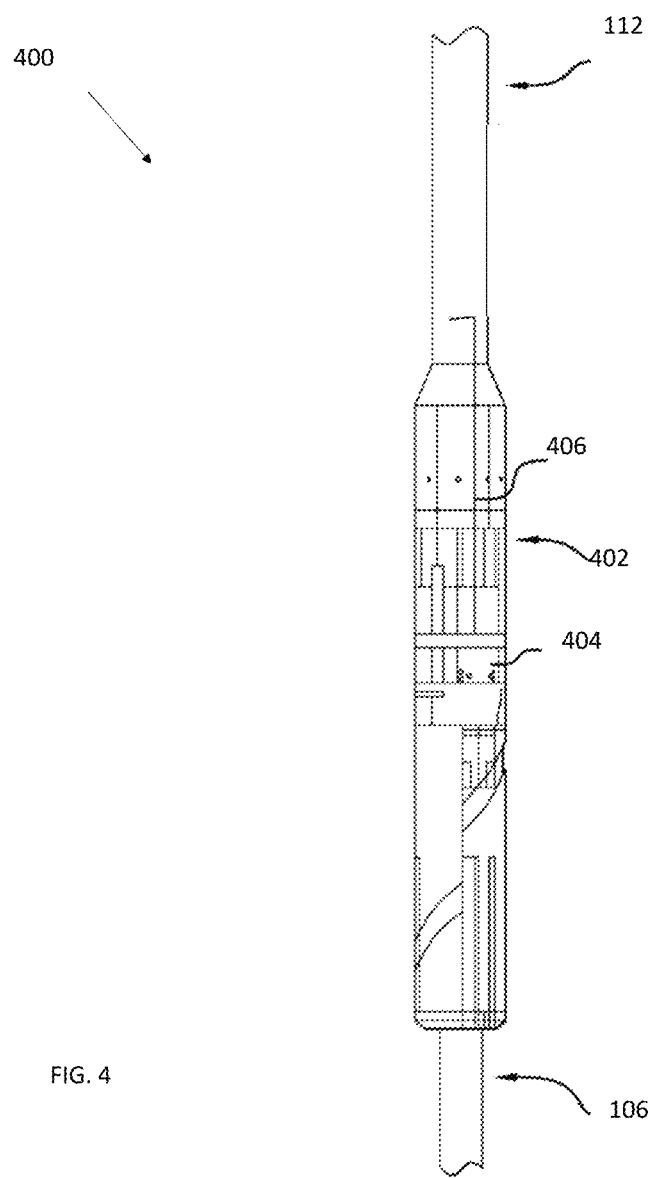
FIG. 4 shows a close-up view of a connection between a first mating end of a first member of the downhole system and a second mating end of the second member.

FIG. 4 shows a close-up view 400 of a connection 402 between the first mating end 108 of the first member 102 and the second mating end 114 of the second member 110. The connection 402 includes a lower wet mate connector, or first wet connect 404, at an end of the first communication link 106. The connection 402 also includes an upper wet mate connector or second wet connect 406 at an end of the second communication link 112. Mating between the first wet connect 404 and the second wet connect 406 is discussed herein with respect to FIGS. 6-7.

Figure 5:
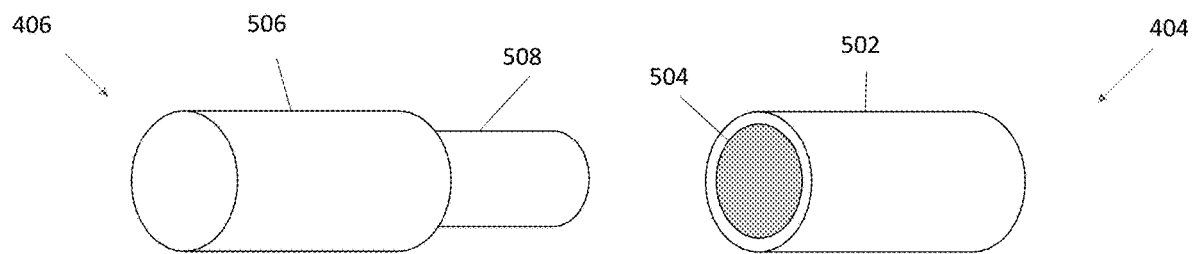
FIG. 5 shows the plug and receptacle in a non-mated position.

FIG. 5 shows the first wet connect 404 and the second wet connect 406 in a non-mated position. The first wet connect 404 includes a receptacle 502 including a socket 504 for mating purposes. The receptacle 502 includes conductive material therein which is connected to a conductor or to the first communication link 106 of the first member 102. The second wet connect 406 includes a plug 506 including a pin 508 that goes inside the socket 504 in order to form the wet connection. The pin 508 can be made of a conductive material and is connected to a conductor or to the second communication link 112 of the second member 110.

Figure 6:
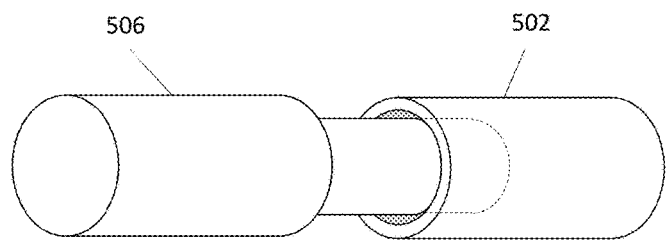
FIG. 6 shows the plug and receptacle in a first mating position.

FIG. 6 shows the plug 506 and receptacle 502 in a first mating position. In the first mating position, or half-mated position, a communication signal is able to pass between the plug 506 and the receptacle 502. Therefore, a testable communication link is established between the first member 102 and the second member 110. However, the plug 506 and receptacle 502 are not permanently mated or locked to each other. In other words, the plug 506 and the receptacle 602 can be returned back to the non-mated position by reversing the direction of the applied force, without having to unbind or unlock them from each other.

If the first member 102 and second member 110 are not aligned, the plug 506 and receptacle 502 will not mate properly. Hence it is desirable to move the first member 102 and the second member 110 to the first mating position and test an unsecured yet testable communication link before committing to, or securing, the connection by moving the plug 506 and receptacle 502 to the second mating position.

Figure 7:
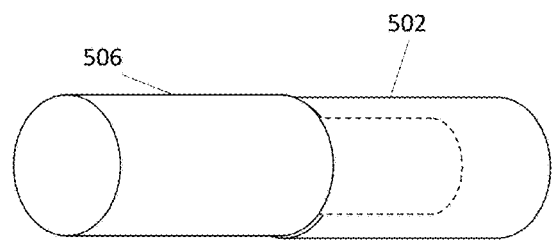
FIG. 7 shows the plug and receptacle in a second mating position.

FIG. 7 shows the plug 506 and receptacle 602 in a second mating position, or fully mated position. In the second mating position, the plug 506 and receptacle 502 are committed to each other. In other words, the plug 506 and receptacle 502 are permanently mated or locked to each other and cannot be separated from each other.

The method disclosed herein allows for control of the forces between the first member 102 and the second member 110 so that a testable communication link can be established between the first member 102 and the second member 110 in the first mating position and the communication link tested before committing to the second mating position.

In order to move from the non-mated position to the first mating position, a first force is applied to move the first member 102 and second member 110 toward each other. This first force can be supplied lowering the second member 110 via derrick 126. When the force rises above a first force threshold, various covers or protective elements between the plug 506 and receptacle 602 are sheared or ruptured, thereby allowing the first member 102 and the second member 110 to move into the first mating position.

In order to move from the first mating position to the second mating position, a second force is applied to move the first member 102 and the second member 110 toward each other, thereby engaging them into a locked or secure position. The first member 102 and the second member 110 enter the second mating position when the applied force rises above a second force threshold. The second force threshold is greater than the first force threshold.

Figure 8:
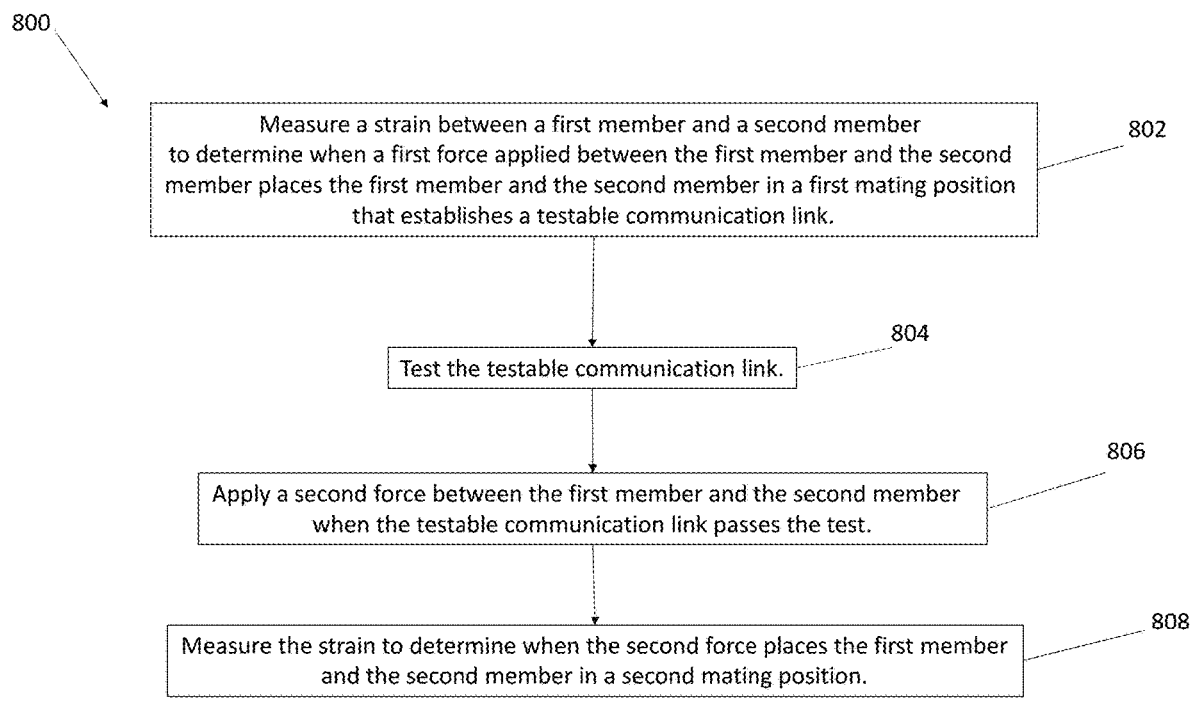
FIG. 8 shows a flowchart illustrating a method of forming a communication link between the first member and the second member.

FIG. 8 shows a flowchart illustrating a method of forming a communication link between a first member 102 and a second member 110 disposed in a wellbore. In box 802, a strain is measured at a mating end of the second member to determine when a first force applied between first member and the second member exceeds a first force threshold, thereby indicating that the first member and the second member are in a first mating position in which a testable a communication link is established between the first member and the second member. In box 804, a test is performed on the communication link with the first member and second member at the first mating position. In box 806, a force is applied between the first member and the second member when the communication link passes the test. In box 808, the strain is measured to determine when the first member and the second member have moved into a second mating position. The second mating position, the first member and the second member are committed to the communication link.

At box 804, testing the testable communication link can include sending an optical signal through the communication link and determining a quality of the communication link from a return signal received in response. If the testable communication link does not meet a specified set of standards, this can indicate a misalignment problem and that further mating of the first member and the second member is to be avoided. In such a situation, the first member and second member can be pulled apart from each other and realigned, after which the mating process can be attempted again from the non-mated state.

In various embodiments, the processor 140 can be at least one processor, such as two different processors. A first processor can test and confirm the communication link and a second processor can determine the force or forces.

Set forth below are some embodiments of the foregoing disclosure:

Embodiment 1: A method for establishing a secure communication link between a first member and a second member in a wellbore. A strain is measured at a mating end of the second member being mated to the first member to determine when a first force between the first member and the second member is greater than a first force threshold that indicates a first mating position in which a testable communication link is established between the first member and the second member. A test is performed on the testable communication link with the first member and the second member at the first mating position.

Embodiment 2: The method of any prior embodiment, further comprising applying a second force between the first member and the second member when the testable communication link passes the test, and measuring the strain at the mating end of the second member to determine when the second force places the first member and the second member in a second mating position.

Embodiment 3: The method of any prior embodiment, wherein the first member is a first tubular having a receptacle and the second member is a second tubular having a plug and wherein, in the first mating position, the plug is reversibly connected to the receptacle and, in the second mating position, the plug is locked into the receptacle.

Embodiment 4: The method of any prior embodiment, further comprising measuring the strain to determine when the second force exceeds a second force threshold as indicative of the first member and the second member being in the second mating position.

Embodiment 5: The method of any prior embodiment, wherein the second force threshold is greater than the first force threshold.

Embodiment 6: The method of any prior embodiment, further comprising measuring the strain using at least one of: (i) a Fiber Bragg grating at the mating end of the first member; and (ii) a strain gauge at the mating end of the first member.

Embodiment 7: The method of any prior embodiment, wherein the force between the first member and the second member is an axial force.

Embodiment 8: An apparatus for forming a secure communication link between a first member and a second member in a wellbore. A strain sensor at a mating end of the second member is configured to measure a strain at the mating end. At least one processor is configured to determine, from the strain, when a first force applied between the first member and the second member exceeds a first force threshold that indicates that the first member and the second member are in a first mating position in which a testable communication link is established between the first member and the second member, and test the testable communication link between the first member and the second member at the first mating position.

Embodiment 9: The apparatus of any prior embodiment, wherein the at least one processor is further configured to determine, from the strain, when a second force, applied between the first member and the second member upon testing the testable communication link, places the first member and the second member in a second mating position.

Embodiment 10: The apparatus of any prior embodiment, wherein the first member is a first tubular having a receptacle and the second member is a second tubular having a plug, and wherein, in the first mating position, the plug is reversibly connected to the receptacle and, in the second mating position, the plug is locked into the receptacle.

Embodiment 11: The apparatus of any prior embodiment, wherein the at least one processor determines when the second force exceeds a second force threshold from the strain to indicate that the first member and the second member are in the second mating position.

Embodiment 12: The apparatus of any prior embodiment, wherein the second force threshold is greater than the first force threshold.

Embodiment 13: The apparatus of any prior embodiment, further comprising a derrick configured to controls axial movement of the second member within the wellbore.

Embodiment 14: The apparatus of any prior embodiment, wherein the at least one processor is further configured to control the derrick to control the force between the first member and the second member.

Embodiment 15: The apparatus of any prior embodiment, wherein the strain sensor is at least one of: (i) a Fiber Bragg grating; and (ii) a strain gauge.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method for establishing a secure communication link between a first member and a second member in a wellbore, comprising:
   measuring, via a strain sensor at a mating end of the second member, a strain at the mating end of the second member as the second member is being mated to the first member;
   a processor to determine when a first force between the first member and the second member is greater than a first force threshold that indicates a first mating position in which a testable communication link is established between the first member and the second member;
   and performing, via the processor, a test on the testable communication link with the first member and the second member at the first mating position.

2. The method of claim 1, further comprising applying a second force between the first member and the second member when the testable communication link passes the test; and measuring the strain at the mating end of the second member to determine when the second force places the first member and the second member in a second mating position.

3. The method of claim 2, wherein the first member is a first tubular having a receptacle and the second member is a second tubular having a plug and wherein, in the first mating position, the plug is reversibly connected to the receptacle and, in the second mating position, the plug is locked into the receptacle.

4. The method of claim 2, further comprising measuring the strain to determine when the second force exceeds a second force threshold as indicative of the first member and the second member being in the second mating position.

5. The method of claim 4, wherein the second force threshold is greater than the first force threshold.

6. The method of claim 1, wherein the strain sensor is at least one of: (i) a Fiber Bragg grating; and (ii) a strain gauge.

7. The method of claim 1, wherein the force between the first member and the second member is an axial force.

8. An apparatus for forming a secure communication link between a first member and a second member in a wellbore, comprising:
   a strain sensor at a mating end of the second member, the strain sensor configured to measure a strain at the mating end;
   at least one processor configured to:
      determine, from the strain, when a first force applied between the first member and the second member exceeds a first force threshold that indicates that the first member and the second member are in a first mating position in which a testable communication link is established between the first member and the second member; and
      test the testable communication link between the first member and the second member at the first mating position.

9. The apparatus of claim 8, wherein the at least one processor is further configured to determine, from the strain, when a second force, applied between the first member and the second member upon testing the testable communication link, places the first member and the second member in a second mating position.

10. The apparatus of claim 9, wherein the first member is a first tubular having a receptacle and the second member is a second tubular having a plug, and wherein, in the first mating position, the plug is reversibly connected to the receptacle and, in the second mating position, the plug is locked into the receptacle.

11. The apparatus of claim 9, wherein the at least one processor determines when the second force exceeds a second force threshold from the strain to indicate that the first member and the second member are in the second mating position.

12. The apparatus of claim 11, wherein the second force threshold is greater than the first force threshold.

13. The apparatus of claim 8, further comprising a derrick configured to controls axial movement of the second member within the wellbore.

14. The apparatus of claim 13, wherein the at least one processor is further configured to control the derrick to control the force between the first member and the second member.

15. The apparatus of claim 8, wherein the strain sensor is at least one of: (i) a Fiber Bragg grating; and (ii) a strain gauge.

* * * * *